(12) United States Patent
Conrad et al.

(10) Patent No.: US 7,464,044 B2
(45) Date of Patent: Dec. 9, 2008

(54) METHOD AND SYSTEM FOR USING EMULATION OBJECTS FOR DEVELOPING POINT OF SALE

(75) Inventors: Daniel Vieira Conrad, Cary, NC (US); John Christian Fluke, Raleigh, NC (US); Jeffrey Lynn Harmon, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1330 days.

(21) Appl. No.: 09/207,130

(22) Filed: Dec. 8, 1998

(65) Prior Publication Data

US 2002/0162095 A1 Oct. 31, 2002

(51) Int. Cl.
*G06Q 99/00* (2006.01)
(52) U.S. Cl. ............... 705/7; 705/16; 705/21; 705/23; 705/1; 703/24; 703/23; 703/27; 714/38
(58) Field of Classification Search ............. 705/7, 705/16, 21, 23, 1; 703/24, 23; 714/38, 27
See application file for complete search history.

(56) References Cited

U.S. PATENT DOCUMENTS

| | | | | |
|---|---|---|---|---|
| 5,088,033 A * | 2/1992 | Binkley et al. | ............... | 703/24 |
| 5,093,776 A * | 3/1992 | Morss et al. | .................. | 703/25 |
| 5,138,706 A * | 8/1992 | Melo et al. | .................... | 703/27 |
| 5,309,444 A * | 5/1994 | Dartois et al. | ............... | 714/710 |
| 5,329,471 A * | 7/1994 | Swoboda et al. | ............. | 703/23 |
| 5,537,539 A * | 7/1996 | Narihiro | ...................... | 714/38 |
| 5,541,863 A | 7/1996 | Magor et al. | ................ | 364/580 |
| 5,548,717 A | 8/1996 | Wooldridge et al. | ... | 395/183.14 |
| 5,557,774 A | 9/1996 | Shimabukuro et al. | ...... | 395/500 |
| 5,600,790 A * | 2/1997 | Barnstijn et al. | .............. | 714/38 |
| 5,680,584 A | 10/1997 | Herdeg et al. | ............... | 395/500 |
| 5,684,721 A * | 11/1997 | Swoboda et al. | ............. | 703/23 |
| 5,715,387 A * | 2/1998 | Barnstijn et al. | .............. | 714/38 |
| 5,758,124 A * | 5/1998 | Ogata et al. | ................... | 703/27 |
| 5,812,668 A * | 9/1998 | Weber | ......................... | 380/24 |
| 5,812,823 A * | 9/1998 | Kahle et al. | ................... | 703/26 |
| 5,815,653 A * | 9/1998 | You et al. | ..................... | 714/38 |

(Continued)

FOREIGN PATENT DOCUMENTS

JP 60017539 A * 1/1985

OTHER PUBLICATIONS

"Emulation Technology Introduces Industry's First PC-Based Incircuit "Open Emulator" Supporting 8-, 16-, and 32-bit Embedded MPU Applications", Jul. 5, 1995, Emulation Technology Press Release.*

*Primary Examiner*—Akiba K Robinson Boyce
(74) *Attorney, Agent, or Firm*—Sawyer Law Group LLP

(57) ABSTRACT

A system and method for developing an application is disclosed. The application is for use with point of sale equipment having a device. The application is capable of utilizing the device when the application is executed on the point of sale equipment. The method and system include providing an emulation module corresponding to the device. The method and system further includes ensuring that the application will utilize the emulation module when the application is executed on the development system. Thus, when the application is executed on the system, the emulation module and the application emulate the interaction between the application and the device that occurs when the application is executed on the point of sale equipment.

15 Claims, 5 Drawing Sheets

U.S. PATENT DOCUMENTS 5,826,057 A * 10/1998 Okamoto et al. .............. 703/24
5,895,452 A * 4/1999 Lum ........................... 705/16
5,901,315 A * 5/1999 Edwards et al. ................ 717/4
5,953,516 A * 9/1999 Bonola ........................ 703/24
6,032,268 A * 2/2000 Swoboda et al. .............. 714/30

* cited by examiner

METHOD AND SYSTEM FOR USING EMULATION OBJECTS FOR DEVELOPING POINT OF SALE

FIELD OF THE INVENTION

The present invention relates to point of sale equipment and more particularly to a method and system for developing applications for point of sale equipment. The method and system allow for testing of the application that is simpler and more closely reflects performance of the application on the point of sale system. Thus, development of the application is facilitated.

BACKGROUND OF THE INVENTION

Point of sale (POS) equipment typically encompasses equipment which facilitates sales and which is physically located where the sales are made. For example, POS equipment may include cash registers that have some intelligence and a remote server to which the cash registers may be coupled. The POS equipment may be coupled to other specialized devices. These specialized devices include keyboards, scanners, scales, or other equipment usually residing in the same physical area as the POS equipment. For example, a cash register may be coupled to a scanner and a scale.

The POS equipment executes applications which use the specialized devices. For example, an application on the POS equipment may require input from the scale in order to calculate a price for an item that is sold based on the item's weight. Typically, drivers which also reside on the POS equipment control the specialized devices. In order to use the specialized device, the application communicates with the driver that controls the specialized device.

Typically, POS equipment has at most a limited environment for the development of software. Consequently, the applications run on POS equipment are generally developed on a separate development system by a software developer. Once development is complete, the application can be adequately run on the POS system.

During conventional development of the application, the developer must ensure that the application will be capable of utilizing the specialized devices. However, the specialized devices are coupled to the POS equipment, rather than the development system. Thus, the developer must have access to POS equipment. Typically, this is accomplished by placing POS equipment in a lab, where many developers have access to the POS equipment and, therefore, the specialized devices.

Although placing the POS equipment in a lab allows applications to be tested, conventional development of the applications is difficult and time consuming. In order to test an application that has been written, a developer copies a portion of the application that has been written from the development system, takes the application to the lab, and downloads the application to the POS equipment. If the application does not function properly, the developer must change the code and repeat the entire process for the new version of the application. This is very time consuming. In addition, the developer will still be limited to working in proximity to the POS equipment because the developer must have access to the POS equipment for testing the application during development. This also makes the development process slower and more difficult. Although each developer can be provided with separate POS equipment, this may be expensive for the developer's employer.

Portions of code designed to account for the absence of the specialized devices on the development system can be added to the application. This allows the application with the additional code to be tested on the development system. However, the application must subsequently be tested on the test system without these additional pieces of code once testing on the development system is completed. This subsequent testing shares many of the same problems as testing the application solely on the test equipment. Thus, the development of applications for POS equipment using conventional mechanisms is inefficient and time consuming.

Accordingly, what is needed is a system and method for facilitating the development of applications to be used on POS equipment. The present invention addresses such a need.

SUMMARY OF THE INVENTION

The present invention provides a method and system for developing an application. The application is for use with point of sale equipment having a device. The application is capable of utilizing the device when the application is executed on the point of sale equipment. The method and system comprise providing an emulation module corresponding to the device. The method and system further comprise ensuring that the application will utilize the emulation module when the application is executed on the development system. Thus, when the application is executed on the system, the emulation module and the application emulate the interaction between the application and the device that occurs when the application is executed on the point of sale equipment.

According to the system and method disclosed herein, the present invention allows the application to be more easily and accurately tested, thereby increasing and facilitating development of the application.

DETAILED DESCRIPTION OF THE INVENTION

The present invention relates to an improvement in the development of applications for point of sale equipment. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
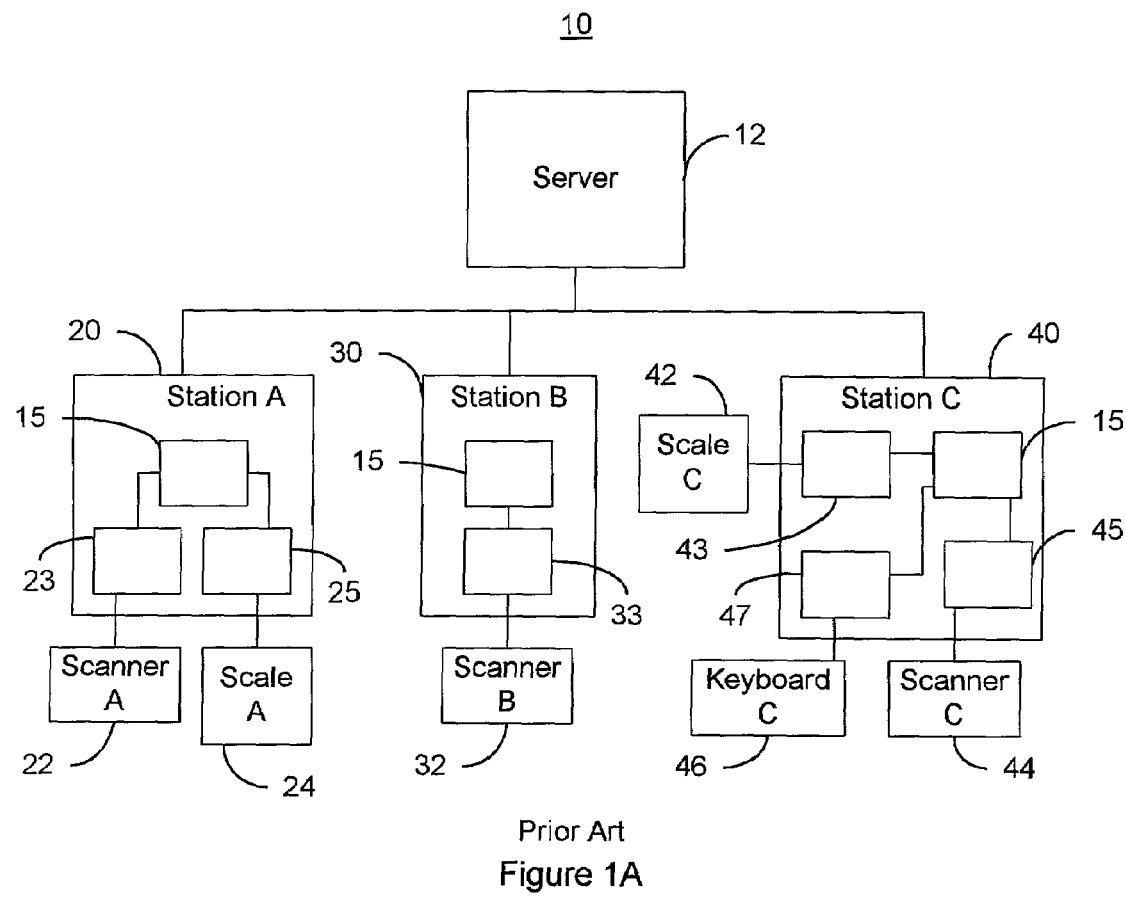
FIG. 1A is a block diagram of a system including point of sale equipment.

FIG. 1A is a block diagram of a system 10 including point of sale equipment that uses specialized devices. The system 10 includes a server 12 coupled with three stations 20, 30, and 40. The stations 20, 30, and 40 include POS equipment which is used when and where the purchase is actually made. For example, the stations 20, 30, and 40 may include cash registers having additional intelligence. The stations 20, 30, and 40 are each coupled to specialized devices. The specialized devices communicate with the stations 20, 30, and 40, and provide special functions to each of stations. Particular specialized devices are depicted in FIG. 1A. The station A is coupled to a scanner A 22 and a scale A 24. The station B is coupled to a scanner B 32. The station C 40 is coupled to a scale C 42, a scanner C 44, and a keyboard C 46. Typically, drivers 23, 25, 33, 43, 45, and 47 control the specialized devices 22, 24, 32, 42, 44, and 46, respectively. Thus, the application 15 interfaces with the drivers 23, 25, 33, 43, 45, and 47 to use the devices 22, 24, 32, 42, 44, and 46, respectively.

The stations 20, 30, and 40 include an application 15. The application 15 is run on the stations 20, 30, and 40. Often, the application 15 may use some or all of the specialized devices 22, 24, 32, 42, 44, and 46. Thus, when such the application 15 is developed, the developer must ensure that the application 15 functions with the specialized devices 22, 24, 32, 42, 44, and 46. Typically, this means that the developer must ensure that the application can communicate with the drivers 23, 25, 33, 43, 45, and 47 for the specialized devices 22, 24, 32, 42, 44, and 46, respectively, and control the devices 22, 24, 32, 42, 44, and 46, respectively, through the drivers 23, 25, 33, 43, 45, and 47, respectively. Note that although the same application 15 is shown on all stations 20, 30, and 40, nothing prevents the stations 20, 30, and 40 from running different applications.

Figure 1B:
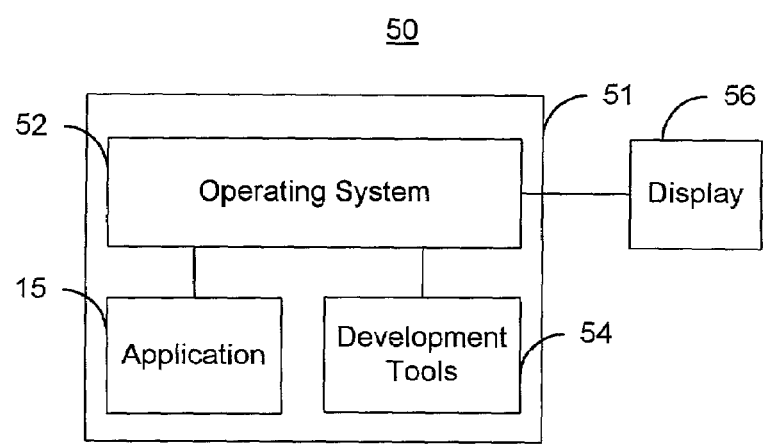
FIG. 1B is a block diagram of a conventional system for developing applications to be run on point of sale equipment.

FIG. 1B depicts a conventional development system 50 for developing an application for use with a system 10 including POS equipment. Typically, POS equipment such as the stations 20, 30, and 40 have very limited development tools, if any. Consequently, development typically occurs using the separate conventional development system 50. The conventional development system 50 includes a computer 51 and a display 56. The computer 51 includes an operating system 52, development tools 54, and the application 15 currently being developed. The development tools 54 and operating system 52 create a development environment that is significantly more sophisticated then may be available in the system 10.

Figure 2:
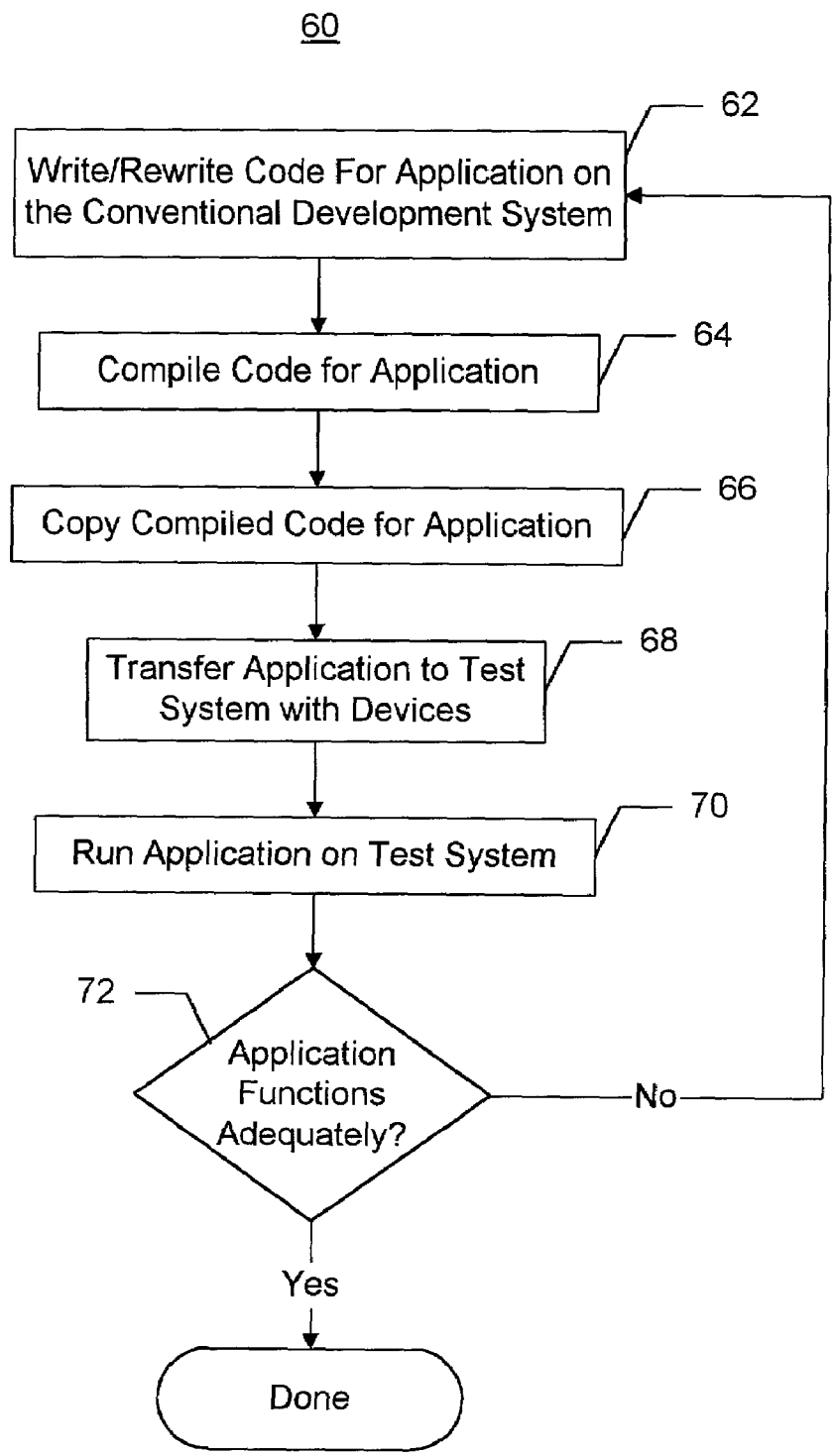
FIG. 2 is a flow chart depicting a conventional method for developing applications to be run on point of sale equipment.

FIG. 2 depicts a conventional method 60 for developing an application 15 for use with a system 10 including POS equipment. The method 60 is used in conjunction with the conventional development system 50. The code for the application 15 is written or rewritten, via step 62. The code for the application 15 is then compiled on the development system, via step 64. Although the application 15 has been compiled in step 64, the application 15 may still be unable to function adequately on the system 10 having POS equipment. In order to function adequately, the application 15 must be able to correctly use the specialized devices 22, 24, 32, 42, 44, and 46. Thus, once the code for the application 15 is compiled in step 64, the application 15 must be tested to ensure that the application 15 can use with the specialized devices 22, 24, 32, 42, 44, and 46. The development system 50 does not include the specialized devices 22, 24, 32, 42, 44, and 46. Consequently, the application 15' must be moved to a test system (not shown) having the specialized devices 22, 24, 32, 42, 44, and 46 for testing.

To test the application 15, the compiled application 15 is copied, for example to a floppy disk, via step 66. The copy of the application 15 is then transferred to a test system, via step 68. The test system has one or more specialized devices that the application may use. For example, one test system could be similar to the station C 40 and include scale C 42, scanner C 44, and keyboard C 46. The application 15 is then run on the test system, via step 70. It is then determined whether the application 15 functions adequately on the test system, via step 72. Step 72 includes determining whether the application 15 can use the specialized devices coupled to the test system. If the application 15 functions adequately, then the developer is finished. However, if the application 15 does not function adequately on the test system, then steps 62 through 72 are repeated until the performance of the application is satisfactory.

Although the method 60 functions, one of ordinary skill in the art will realize that the method 60 has several drawbacks. The combination of the step 66 of copying the application and the step 68 of transferring the application 15 to the test system is tedious and time consuming. Step 68 typically includes physically transferring the application 15 to the test system and downloading the application 15 to the test system so that the application 15 can be run on the test system. This is a tedious process. In addition, if it is determined in step 72 that the application does not adequately function with the test system, then the whole method 60, including copying the application 15 and transferring the application 15 to the test system, must be repeated. The application could be used on a variety of systems 10 that use several different platforms. If the application 15 is not platform independent, the method 60 must also be repeated for each platform on which the application may be run. This is because the drivers for specialized devices 22, 24, 32, 42, 44, and 46 may be different on each platform. Thus, development of the application is further slowed.

Moreover, the test system must be provided to allow the developer to test the application 15. Typically, a lab including one or more test systems is provided for use by several developers. However, if there are many developers using the lab, a developer may have to schedule time on the test system. In addition, because the developer must repeatedly use the lab during development, the developer cannot efficiently develop the application 15 in another location, such as the developer's home. Although providing each developer with at least one test system would solve some of these problems, the cost may be prohibitive and would leave the other problems unsolved.

Finally, limited testing of the application 15 may be performed on the conventional development system 50. However, in order to do so, additional code designed to account for the absence of the specialized devices on the conventional development system 50 must be added to the application. The application 15' plus the additional code is then run on the conventional development system 50, rewritten to overcome inadequacies, and run again until the application 15' plus the additional code can run adequately on the conventional development system. Once testing on the conventional development system is complete, this additional code is removed from the application 15'. The application 15' must then be tested without the additional code on the test system. Typically, the testing of the application 15' on the test system is relatively extensive. Thus, the method 60 is still used for the application 15'. Thus, many drawbacks of the method 60 are still present.

The present invention provides for a method and system for developing an application for use with point of sale equipment having a device. The application is capable of utilizing the device when the application is executed on the point of sale equipment. The method and system comprise providing an emulation module corresponding to the device. The method and system further comprise ensuring that the application will utilize the emulation module when the application is executed on the development system. When the application is run on the system, the emulation module and the application emulate the interaction between the application and the device that occurs when the application is executed on the point of sale equipment.

The present invention will also be described in terms of particular devices and a particular language. However, one of ordinary skill in the art will readily recognize that this method and system will operate effectively for other devices and for other languages. Moreover, the present invention is described in the context of modules used in object oriented programming. However, nothing prevents the use of the present invention in conjunction with other types of programming. Although the present invention finds particular utility in a platform independent context, the present invention need not be platform independent.

Figure 3:
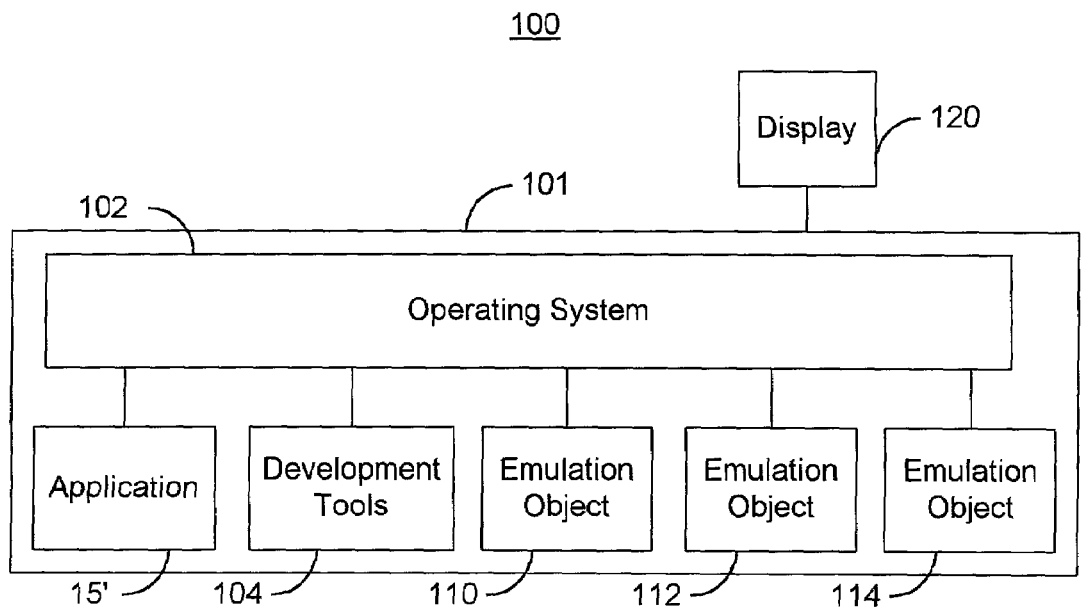
FIG. 3 is a block diagram of a development system in accordance with the present invention.

To more particularly illustrate the method and system in accordance with the present invention, refer now to FIG. 3 depicting a block diagram of one embodiment of such a development system 100. The system 100 is for use in developing applications for the system 10 that includes POS equipment. The system 100 a computer 101 coupled to a display 120. The computer 101 includes an operating system 102, development tools 104, an application 15' that is that is currently being developed, and emulation modules 110, 112, and 114. The development tools 104 are for use in facilitating developing the application 15'. The combination of the development tools 104 and the operating system 102 provide a development environment that is more sophisticated than in the system 100. The application 15' is analogous to the application 15. Thus, the application 15' is being developed for use on a system 10 including point of sale equipment 20, 30, and 40 having specialized devices 22, 24, 32, 42, 44, and 46. The emulation modules 110, 112, and 114 correspond to the devices (not shown in FIG. 3) which the application 15' will use when executing on the system for which the application 15' is being developed. For the purposes of discussion it is presumed that the emulation modules 110, 112, and 114 are for emulating the devices 42, 44, and 46 on the station C 40. Thus, when the application is run on the development system 100, the emulation objects 110, 112, and 114 make it appear to the application 15' as though the devices 42, 44, and 46, respectively, are present and being used. In a preferred embodiment, the emulation modules 110, 112, and 114 emulate the devices 42, 44, and 46 and the corresponding drivers 43, 45, and 47.

In a preferred embodiment, modules 110, 112, and 114 are platform independent and object oriented. Consequently, they will be referred to as emulation objects 110, 112, and 114. The emulation objects 110, 112, and 114 can be used to emulate the interaction between the application 15' and specialized devices 42, 44, and 46 which the application 15' may use when run on the real point of sale equipment. The emulation objects 110, 112, and 114 perform this function when the application 15' is run on the system 100. In one embodiment, the emulation objects 110, 112, and 114 are written in JAVA and emulate the drivers 43, 45, and 46, respectively, and the scale C 42, the scanner C 44, and the keyboard C 46, respectively. The emulation objects 110, 112, and 114 make it appear to the application 15' that the application is actually utilizing the specialized devices 42, 44, and 46. In other words, when the application 15' is run on the development system 100, the application will encounter the emulation objects 110, 112, and 114 that behave as though the application is communicating directly with the devices 42, 44, and 46.

Figure 4:
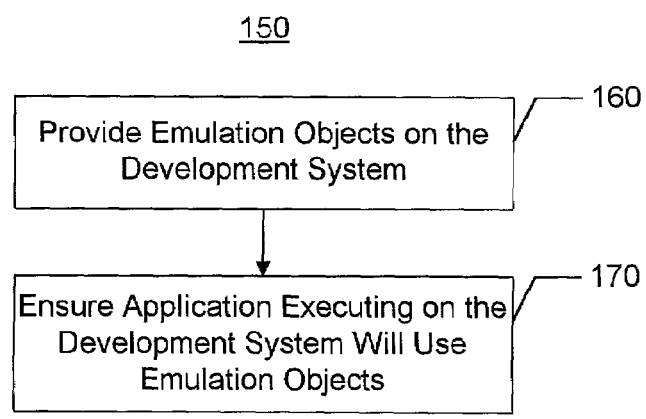
FIG. 4 is a flow chart depicting a method for providing a development environment in accordance with the present invention.

FIG. 4 depicts a method 150 for providing a development system in accordance with the present invention. The emulation objects 110, 112, and 114 are provided on the development system 100, via step 160. Thus, the emulation objects 110, 112, and 114 are made available to the developer when developing the application 15'. It is then ensured that when the application 15' is executed on the development system 100, the application 15' will utilize the emulation objects 110, 112, and 114, via step 170. In a preferred embodiment, step 170 includes ensuring that the application 15' will encounter the emulation objects 110, 112, and 114 when the application 15' is run on the development system 100. Once the application 15' encounters the emulation objects 110, 112, and 114, the application 15' utilizes the emulation objects 110, 112, and 114 as though the application was using the devices 42, 44, and 46 to which the emulation objects 110, 112, and 114 correspond.

The method 150 and the development system 100 in accordance with the present invention ensure that the developer can more accurately test the application 15' on the development system 100, rather than using a separate test system. The method 150 and development system 100 also ensure that the developer can test the application 15' on the development system 100 without placing additional code in the application 15'. Furthermore, running the application 15' on the development system 100 will give the developer a more accurate indication of the behavior of the application 15' on the system 10 than adding additional code to the application 15'.

Figure 5:
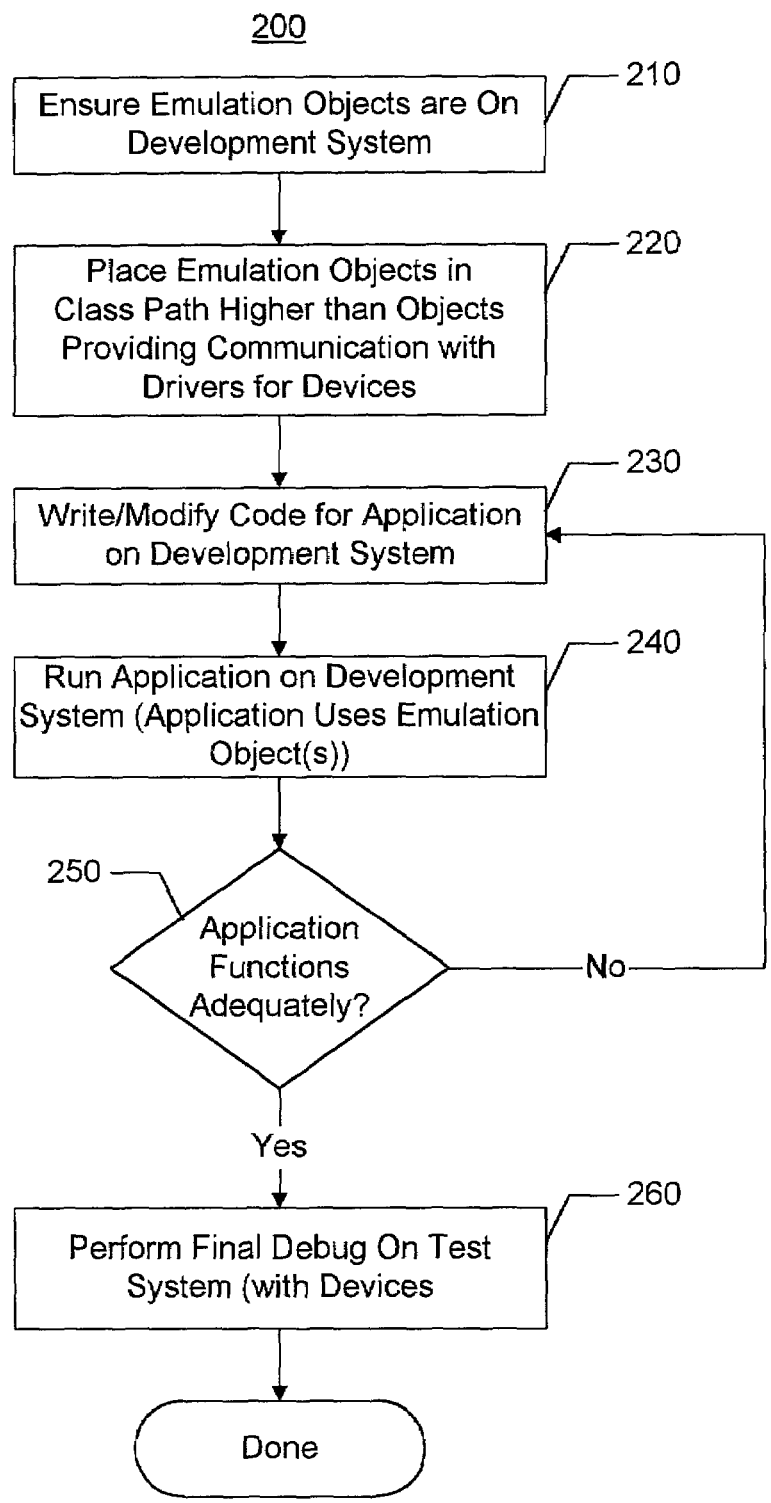
FIG. 5 is a flow chart depicting a method for testing an application in accordance with the present invention.

FIG. 5 depicts a more detailed flow chart of a preferred embodiment of a method 200 in accordance with the present invention for developing the application 15'. Referring to FIGS. 3 and 5, the method 200 is used in conjunction with the system 100. It is ensured that the emulation objects 110, 112, and 114 are on the development system 100, via step 210. Step 210 includes providing the emulation objects 110, 112, and 114 in JAVA. Thus, the emulation objects 110, 112, and 114 are platform independent.

Via step 220, the emulation objects 110, 112, and 114 are then placed higher in the class path than the objects which will provide communication with the drivers 43, 45, and 47, respectively, for the devices 42, 44, and 46, respectively, which the application 15' will use. Step 220 is analogous to the step 170 of the method 150. In JAVA, applications access devices 42, 44, and 46 based on the class of each device 42, 44, and 46. A class path defines the order of the locations in which a JAVA application will look to find object classes. An object class which is higher in the class path will be located before and accessed in lieu of an object class of the same name that is lower in the class path. Because the emulation objects 110, 112, and 114 are placed higher in the class path than object classes of the same name which provide communication with the real device driver 43, 45, and 47, respectively, the application 15' will locate the emulation objects 110, 112, or 114 first when the application 15' is being executed on the development system 100. Thus, the application 15' will use the emulation objects 110, 112, or 114 when the application 15' is executed on the development system 1 00.

The code for the application 15' is written or modified and compiled, via step 230. To test the application 15', the application 15' is run on the development system 100, via step 240. Because steps 210 and 220 have been carried out, the application 15' will use the emulation objects 110, 112, and 114 in step 230. It is then determined if the application 15' functions adequately, via step 250. Step 250 preferably includes determining whether the application 15' can use the emulation objects 110, 112, and 114 properly. If not, then steps 230, 240, and 250 are reiterated until the application 15' functions adequately.

Once the application 15' functions adequately on the development system, a final debug is performed, via step 260. Step 260 includes running the application 15' on a test system (not shown) which actually includes the devices 42, 44, and 46 that the application 15' may use. Thus, the application 15' is preferably run on a test system (not shown) which is includes the station C 40 and the devices 42, 44, and 46. Because the emulation objects 110, 112, and 114 are not on either the test system or the actual system 10, the application 15' will utilize the devices 42, 44, and 46 when run on the test system or the station C 40. The final debug performed in step 260 accounts for any differences, such as minor timing differences, between using the actual hardware for the devices 42, 44, and 46, and using the emulation objects 110, 112, and 114. However, these differences may be minimal, making the final debug step 260 relatively simple. Development of the application 15' is then complete.

Figure 6:
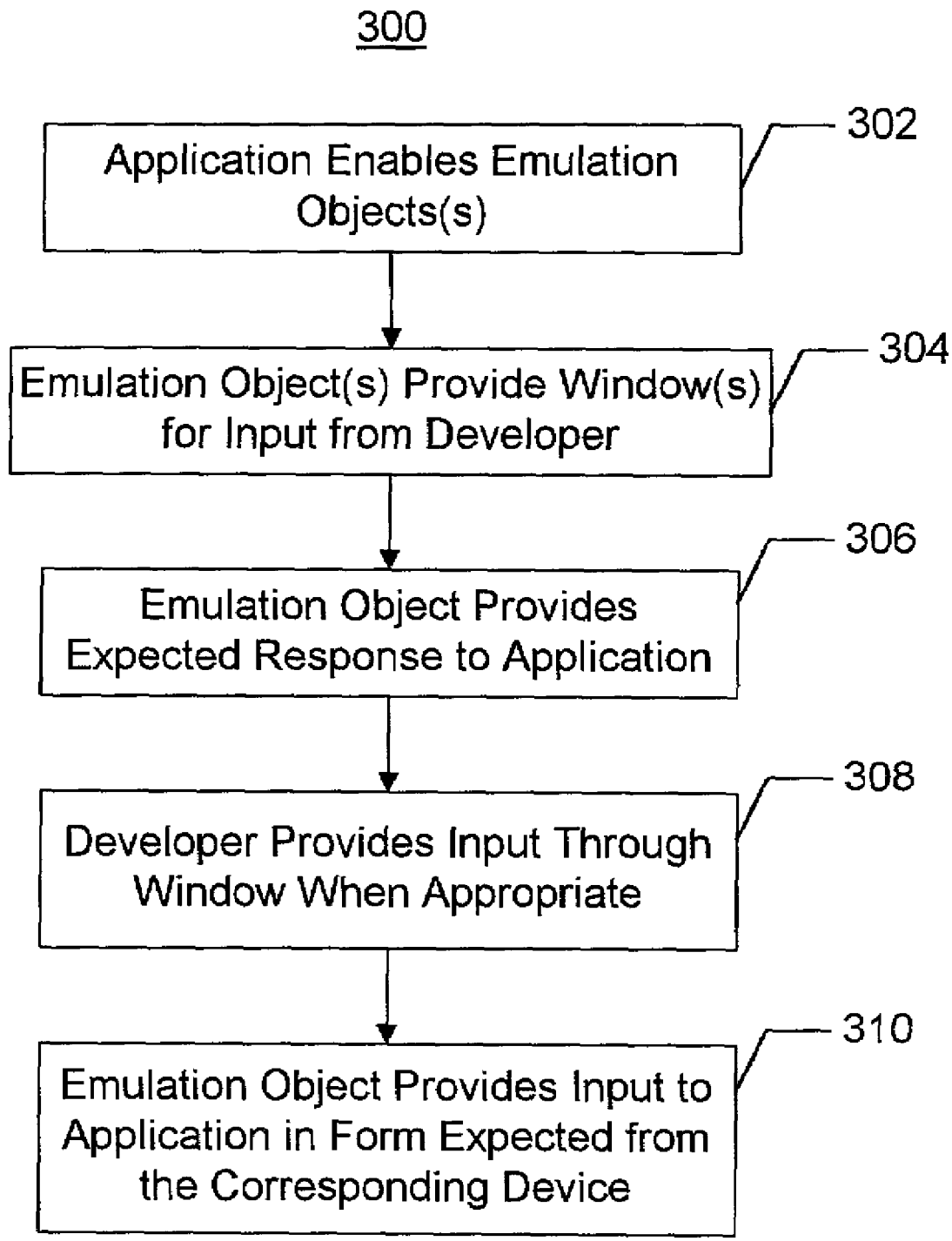
FIG. 6 is a flow chart depicting the interaction between the emulation object and the application in accordance with the present invention.

FIG. 6 depicts a flow chart of a method 300 indicating a portion of the interaction between the application 15' and the emulation objects 110, 112, and 114 while the application 15' is run on the development system 100. The application 15' enables the emulation objects 110, 112, or 114, via step 302. The emulation object then provides a window (not shown) on the display 120 of the development system 100, via step 304. From the window, the user can provide input to the application 15'. The emulation objects 110, 112, or 114 also respond to a device specific command, via step 306. The emulation objects 110, 112, or 114 provide the response expected from the corresponding device 42, 44, or 46, respectively, in step 306. The application 15' may expect input from the devices 42, 44, or 46 corresponding to the emulation objects 110, 112, or 114, respectively. If so, then the developer provides the input to the window, via step 308. The emulation object 110, 112, or 114 then provides the input to the application 15' in step 310. The emulation object 110, 112, or 114 provides the input in the form expected from the drivers 43, 45, or 47 of the devices 42, 44, or 46. Referring back to FIG. 5, the developer can then determine in step 250 if the application 15' has adequately responded to the information provided from the emulation objects 110, 112, or 114. For example, when the application is being run on the system 10, the scanner 40 may provide a stock number to the application 15' so that the application 15' can calculate a price. The developer can provide the stock number in step 308. The emulation object 112 provides the stock number to the application 15' in the form expected from the driver 45 of the scanner 44. The developer can then determine if the application 15' has calculated the price correctly. If not, then the developer can modify and retest the application on the development system 100 using the method 200.

Because the emulation objects 110, 112, and 114 are used, the developer can obtain an accurate picture of how the application 15' will function on point of sale equipment for which the application 15' is being developed. As a result, the tedious and repeated transfer of the application to the equipment is avoided. When the emulation objects 110, 112, and 114 and the application 15' are platform independent, the same code is executed on the real system 10 and the development system 100. Therefore, a very complete picture of the application's behavior is obtained by testing the application on the development system 100. Even when the emulation objects 110, 112, and 114 and the application 15' are not platform independent, the same source code for the application 15' may be used. However, sets of emulation objects 110, 112, and 114 specific to the platform used by the system 10 are preferably used. Thus, emulation objects 110, 112, and 114 are preferably provided for each platform when the emulation objects 110, 112, and 114 and the application 15' are platform dependent. For example, if the application 15' is written in C, the same source code could be used. The source code would be compiled and linked for each platform with which the code is to be used. The linked code would then be used with emulation objects 110, 112, and 114 specific to each platform. However, in a preferred embodiment, the emulation objects 110, 112, and 114 are platform independent.

In either the platform independent or the platform dependent case, additional code need not be added to the application 15'. Furthermore, testing on the development system 100 provides a more accurate picture of the behavior of the application 15' than testing the application 15 with additional code on the conventional development system 50. In addition, the class path determines whether the emulation objects 110, 112, and 114 or the devices 42, 44, and 46, respectively, will be used. It is, therefore, easy for a developer to determine whether the application 15' is attempting to use the emulation objects 110, 112, and 114, or the devices 42, 44, and 46, respectively.

The developer is also free to develop the application 15' on any development system 100 having the emulation objects 110, 112, and 114. Thus, the developer need not remain near a lab having separate test equipment in it or incur the expense of having separate test equipment at each location the developer desires to work. In addition, the final debug using the separate test equipment is significantly simpler. Therefore, development of the application 15' is made simpler, faster, and more efficient.

A method and system has been disclosed which allows a developer to more efficiently develop applications executed by point of sale equipment coupled to devices used by the application. Software written according to the present invention can be stored in some form of computer-readable medium, such as memory or CD-ROM, or can be transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a point of sale environment for developing an application on a development system independently of a point of sale system, the application for use with point of sale equipment having a device, the application capable of utilizing the device when the application is executed on the point of sale equipment, the application interfacing with an operating system on the development system, the method comprising the steps of:

(a) providing an emulation module interfacing directly with the operating system and corresponding to the device;

(b) ensuring that the application will utilize the emulation module when the application is executed on the development system; and (c) executing the application on the development system independently of the point of sale system, wherein the emulation module and the application emulate the interaction between the application and the device that occurs when the application is executed on the point of sale equipment;

wherein the emulation module and the application both interface directly with the operating system of the development system; and wherein the device is specialized for the point of sale equipment.

2. The method of claim 1 wherein the step of providing the emulation module further includes the steps of:

(a1) providing an emulation object corresponding to the device.

3. The method of claim 2 wherein the application is platform independent and the emulation object is platform independent.

4. The method of claim 3 wherein the application is a JAVA application and the emulation object is a JAVA emulation object.

5. The method of claim 2 wherein the point of sale equipment includes a driver for controlling the device, the application interfacing with the driver when the application utilizes the device.

6. The method of claim 5 wherein the emulation object emulates the driver and the device.

7. A method for testing an application on a development system having an operating system, the application for use with point of sale equipment having a device, the application interfacing with the operating system and being capable of utilizing the device when the application is executed on the point of sale equipment, the method comprising the steps of:

(a) providing an emulation object interfacing directly with the operating system and corresponding to the device;

(b) ensuring that the application will utilize the emulation object when the application is executed on the development system;

(c) executing the application on the development system;

(d) ensuring that the application adequately utilizes the emulation object; and (e) executing the application on the point of sale equipment;

wherein when the application is executed on the development system, the emulation module and the application emulate the interaction between the application and the device that occurs when the application is executed on the point of sale equipment;

wherein the emulation module and the application both interface directly with the operating system of the development system; and wherein the device is specialized for the point of sale equipment.

8. A system, including an operating system, for developing an application for use with point of sale equipment having a device, the application interfacing with the operating system and capable of utilizing the device when the application is executed on the point of sale equipment, the system comprising:

an emulation module interfacing directly with the operating system and corresponding to the device; and means for ensuring that the application will utilize the emulation module when the application is executed on the development system;

wherein when the application is executed on the system, the emulation module and the application emulate the interaction between the application and the device that occurs when the application is executed on the point of sale equipment;

wherein the emulation module and the application both interface directly with the operating system of the development system; and wherein the device is specialized for the point of sale equipment.

9. The system of claim 8 wherein the emulation module further includes:

an emulation object corresponding to the device.

10. The system of claim 9 wherein the application is platform independent and the emulation object is platform independent.

11. The system of claim 10 wherein the application is a JAVA application and the emulation object is a JAVA emulation object.

12. The system of claim 9 wherein the point of sale equipment includes a driver for controlling the device, the application interfacing with the driver when the application utilizes the device.

13. The system of claim 12 wherein the emulation object emulates the driver and the device.

14. A computer readable medium containing at least one program for testing an application on a development system having an operating system, the application for use with point of sale equipment having a device, the application interfacing with the operating system and being capable of utilizing the device when the application is executed on the point of sale equipment, the program containing instructions for:

providing an emulation module interfacing directly with the operating system and corresponding to the device;

wherein the application is capable of utilizing the emulation module in lieu of the device when the application is executed on the development system and;

wherein when the application is executed on the development system, the emulation module and the application emulate the interaction between the application and the device that occurs when the application is executed on the point of sale equipment;

wherein the emulation module and the application both interface directly with the operating system of the development system; and wherein the device is specialized for the point of sale equipment.

15. A computer readable medium containing at least one program for facilitating development of an application on a development system having an operating system, the application for use with point of sale equipment having a device, the application interfacing with the operating system and being capable of utilizing the device when the application is executed on the point of sale equipment, the program containing instructions for:

emulating the interaction between the application and the device using an emulation module interfacing directly with the operating system;

allowing a developer to provide input; and providing the input to the application in a form expected from the device;

wherein the emulation module and the application both interface directly with the operating system of the development system; and wherein the device is specialized for the point of sale equipment.

* * * * *